3,048,516
Patented Aug. 7, 1962

3,048,516
ALUMINIUM FUNGICIDE
Americo Mosca, 27 Via Carlo Boggio, Cuneo, Italy
No Drawing. Filed Sept. 15, 1953, Ser. No. 380,347
2 Claims. (Cl. 167—14)

The present invention relates to products used for fighting the diseases caused in plants by fungi or vegetable parasites. Bordeaux mixture or other copper derivatives, or barium, sodium, calcium polysulfides or zinc dithiocarbonates have been used successfully for this purpose. However, these preparations involve high manufacturing costs.

It is an object of the invention to provide a very efficient fungicidal product which combines a very reduced cost with a remarkably easy production.

I have now found that very satisfactory results can be achieved with a fungicide composition having as its basic component a polar inorganic or organic aluminum compound, such as aluminum sulfate or double aluminum salts, which produces free aluminum ions in an aqueous solution. Suitable amounts of adhesive and dyeing substances are added to the basic component.

The adhesive substance has the object of achieving a better adhesion of the basic component to the plant leaves and it is essential that it does not form insoluble compounds with the polar aluminum compounds so that the same may evolve aluminum ions upon dissociation of the compound in water. Such adhesive substances include kaolin, talc, bentonite, calcium sulfate and the like.

Furthermore, since the fungicide of the invention is a limpid solution having a light pink shade, it is necessary to add to the composition a dyeing substance, such as methylene blue or malachite green, which performs the function of showing where the composition has been sprinkled during spraying operations.

The fungicide according to the invention will normally be sold as a solid and water will be added when necessary by the user.

Since aluminum ores are widely spread all over the world in the percentage of about 8% of the whole mass, the economic importance of the discovery becomes apparent, when taking into account that the soluble aluminum derivatives, when substituted for the copper salts as a remedy against the common plant diseases up to now fought by said salts, present the advantage of being able successfully to fight all the other plant diseases hitherto resisting the action of all the other known fungicidal compounds, as the tomato and pepper-plant "Fusarium vasinfectum," the "Fusarium dianthi" affecting carnations and all the other "Fusarium" species which cause heavy damages to vegetables, flowers, bulbs or bulbous plants, and to acid fruits, vines, cereals, mulberry trees, potatoes, cucumbers, pumpkins and melons.

Starting in 1921, the application of aluminum derivatives in the form of aluminum sulfate admixed with quick or slaked-lime in the colloidal state was attempted, both in France and in Italy, but the results were useless.

Essentially, the invention, resides in the fact that stable aluminum derivatives which, when dissociating in water, provide free aluminum ions, represent very efficient fungicidal products, while aluminum hydrate and oxide, in any physical (colloidal or powder) form or structure, are not able to avoid the sporule germination, due to their very poor water solubility.

The use, as a fungicide, of aluminum sulfate, chloride or nitrate, treated with slaked or quick-lime or with any other base, is completely deprived of useful results, since these compounds produce immediately aluminum hydrate which is substantially insoluble and free from aluminum ions.

The action exerted by the sodium or potassium aluminates is very limited in extent, since these compounds are unstable and atmospheric agents will form aluminum carbonate and, successively, hydrate therewith, thus strongly reducing the fungicidal power of such aluminates.

Excellent fungicidal results are achieved by the use of double aluminum and potassium salts (for instance: double aluminum and potassium sulfate), that is by the use of double salts which, when dissociating in water, produce free aluminum ions.

Unsatisfactory results are produced by the use of organic compounds of oxygen, which, although soluble, do not produce free aluminum ions in an aqueous solution, while organic aluminum derivatives (for instance aluminum acetate) which, dissociating, will free aluminum ions, have excellent fungicidal features.

Effective results have been obtained with aqueous solutions containing 0.5% to 1.5% of aluminum sulfate, 1% to 1.5% of kaolin, talc or calcium sulfate, or 0.5 to 1.5% bentonite, and 2–3 grams of methylene blue or malchite green per 100 liters of water, all percentages being by weight. The aluminum sulfate was employed in the form of small crystal flakes having 19 molecules of water of crystallization and an aluminum titer of 17–18%.

The results of laboratory and field tests for two consecutive years confirmed completely the power of the aluminum derivatives having free ions to overcome plant diseases.

Field tests were effected with a mixture which, in the following description, is referred to as the standard mixture, having the following composition:

| | Grams |
|---|---|
| Aluminum sulfate | 550 |
| Bentonite | 430 |
| Methylene blue | 2 |
| Calcium carbonate | 20 | the mixture being diluted in 50–100 liters of water for application to the plants.

Addition of calcium carbonate is necessary to neutralize the free acid limited to an amount obtained in commercial aluminum sulfate since such acidity is harmful to some plants, even if present in very reduced amount (as for instance 1 part per 10,000).

The experiments were effected on a very great number of plants for a duration of two agricultural years giving excellent results.

As an example: the test was effected on 30,000 pear and apple trees of every type; on 10,000 peach trees of every type; on 50,000 vine plants (of the "barbera," "dolcetto," "freisa," "nebbiolo," "barbaresco," "muscat," "ripening in July" types and of assorted types); on 200,000 pepper-plants of every type; on 20,000 tomato plants of every type; on 250,000 potato plants of every type; on 400,000 carnation plants of all the best praised varieties including "valentine" and "minerva"; on 100,000 rosebushes, bulbs and bulbous plants, chrysanthemums, ornamental plants and so on, and also on cereals, spinach, asparagus, onion, celery, pumpkin, apple, cucumber, water melon plants and on nursery beech trees.

In none of the experiments did the fungicide exhibit any toxicity, and a flourishing vegetation with excellent crops was observed.

In effect, since the aluminum sulfate mixtures are provided at a pH value equal to that of the plant lymph, the result is the absorption of aluminum with subsequent formation of proteinate which acts as a catalyst, thus favoring the attainment of an excellent crop.

The accurate examination of the produce obtained with the aid of the novel fungicide allowed a premature or earlier ripening and a better crop than that obtained by plants treated with other fungicidal mixtures.

The standard mixture may be applied in the following doses:

Against vine mildew: 0.50–0.75% for the first two treatments; 1–1.5% as standard treatment; 2% in case of strong mildew attacks;

Against grape mildew: treatment in dry form;

Against the potato-, tomato-, tobacco-, clover-; beet-root-plant, beech-tree, ash-tree, pine-tree, and pepper-plant mildew: 1% solution;

Against gummosis of peach-, apricot-, cherry- and mulberry-trees—during the full vegetation period: 1% solution; during the "vegetative rest" before the blooming: 3–4% solution;

Against the canker and the "dryness" of pear- and apple-tree branches, after removal of the rotten portion: treatment with a 3–4% solution;

Against the "*Exoascus deformans*" of peach-, plum- and almond-trees and against the "Tafrina" or "*Exoascus pruni et cerasi*": 3–4% solution as preventing treatments during the "vegetative rest"; 1% solution during the full vegetation period.

The treatments can be practiced on peach trees during the full vegetation time since the novel mixture doesn't exert any toxic action on the leaves. These treatments appear to be very efficient to stop or prevent the development of the gummosis, which attacks the fruits during the summer period.

Against the pear- and apple-tree scab-preventing treatments during the vegetative rest: 4% solution; during the full vegetation period: 1% solution.

Against the anthracnose of French beans, beans, chick peas, peas: 1–1.5% solution.

For the cereal disinfestation: 150–200 grams per 220 pounds.

Against the "*Fusarium vasinfectum*" of pepper plants and against various species of "Fusarium" of spinach-, onion-, asparagus-, celery-, pumpkin-, mad apple-, watermelon-, cucumber-plants and beech-tree nursery gardens: treatment in powder form on the stems of the plants and sprinkling with 1–2% solution; treatment in powder form on the nursery garden soil.

Against the "*Rizoctonia solani*," the "*Alternaria dianthi*," the "*Fusarium dianthi*," the "*Uromyces caryphillimus*," the "*Septoria*," the "*Heterosparium echimulatum*": application of 1–1.5% solution in the case of rose and bulbous plants.

Against the "*Fusarium dianthi*": application in powder form on the stem of the plants and for cuttings (propagations), and as fungicide both in powder and in 1–2% solution form in the case of all the other plants.

It will be noticed that the preparation according to the invention is positively harmless and non-toxic to the plants, while it appears to be also harmless and non-corrosive for the farm-tools.

What I claim is:

1. A fungicidal aqueous solution containing aluminum ions and consisting essentially of water, about 0.5–1.5% of aluminum sulfate, about 0.5–1.5% of an adhesive selected from the group consisting of kaolin, bentonite, talc and calcium sulfate, and a trace of a dyestuff, all percentages being by weight of the total solution.

2. The fungicidal solution of claim 1, wherein the aluminum sulfate contains free acid impurities, comprising less than 5% by weight, based on the aluminum sulfate, of calcium carbonate and sufficient to neutralize the free acid in the sulfate.

References Cited in the file of this patent

UNITED STATES PATENTS

| | | |
|---|---|---|
| 121,038 | Bathy | Nov. 21, 1871 |
| 128,079 | Sturges | June 18, 1872 |
| 295,876 | Kennedy | Mar. 25, 1884 |
| 341,091 | Bouton | May 4, 1886 |
| 2,203,744 | Peddrick | June 11, 1940 |

FOREIGN PATENTS

| | | |
|---|---|---|
| 673,164 | Germany | Mar. 16, 1939 |
| 882,542 | France | June 7, 1942 |
| 399,337 | Italy | Oct. 24, 1942 |
| 400,194 | Italy | Nov. 25, 1942 |
| 892,221 | France | Mar. 31, 1944 |
| 443,203 | Italy | Dec. 15, 1948 |
| 443,701 | Italy | June 3, 1949 |
| 1,013,498 | France | July 29, 1952 |
| 55,242 | France | Oct. 2, 1951 |

(Addition 6 to No. 891,028)

OTHER REFERENCES

Frear: Chemistry of Insecticides, Fungicides and Herbicides, pages 256, 286–7, D. Van Nostrand, N.Y., 2nd Ed., 1948.

Frear: Catalogue of Chemical Fungicides, vol. II, 1948, Waltham, Mass., page 34.

"Hackh's Chemical Dictionary," Grant, Blakiston Co., 3rd Edition (1944), page 40.

Agriculture Handbook #69, W. V. King (1954), pages 4 and 46.

"Antiseptics, Disinfectants and Fungicides and Sterilizations," G. F. Reddish Lea and Febeger (1954), article by I. B. Romans, pages 388–428.

Handbook of Chemistry and Physics, 28th Ed. 1944, page 1363, Chemical Rubber Publishing Co.